Figure 1:
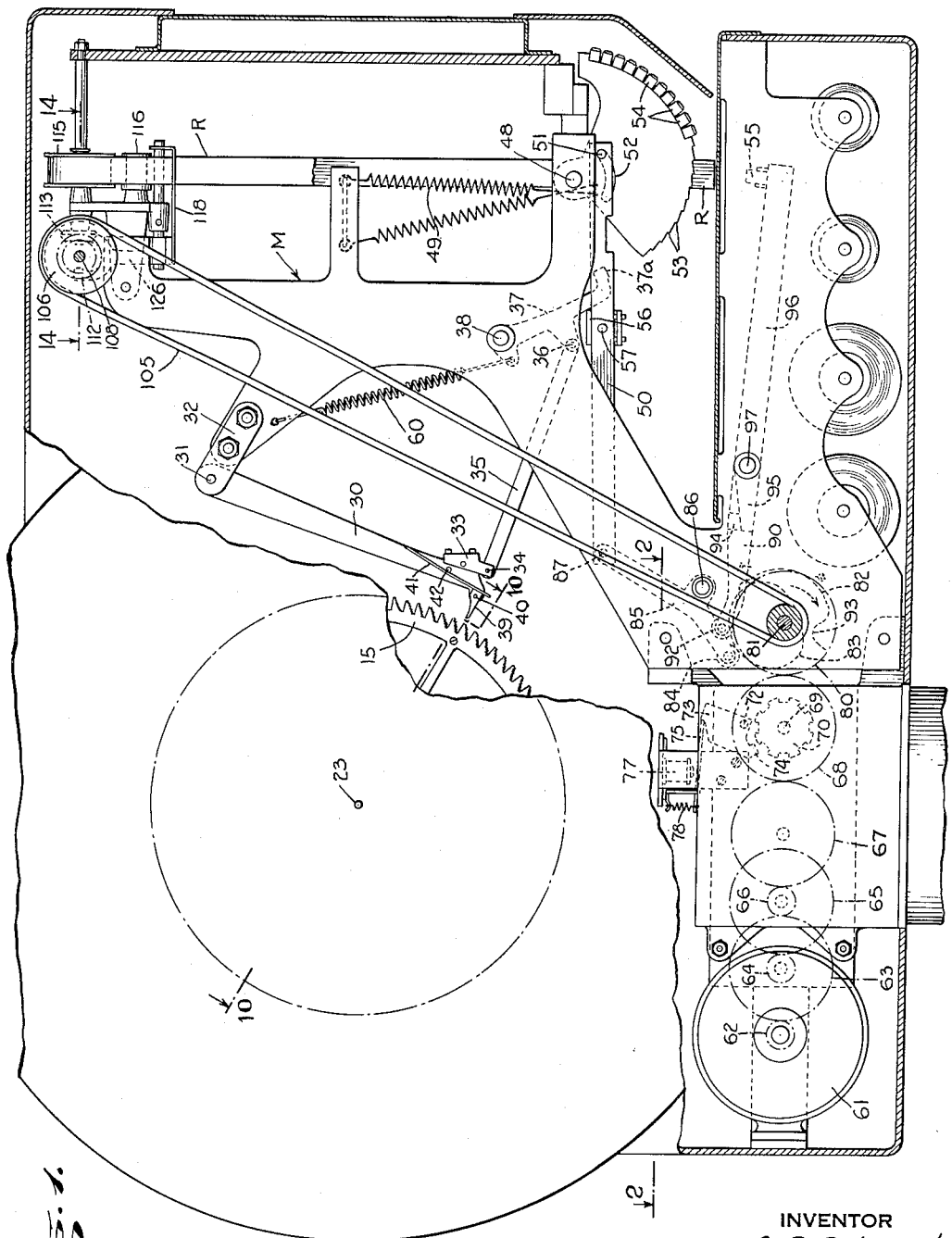

Oct. 4, 1955  C. S. SCHROEDER  2,719,669
PRINTING SCALE
Filed July 15, 1949  6 Sheets-Sheet 2
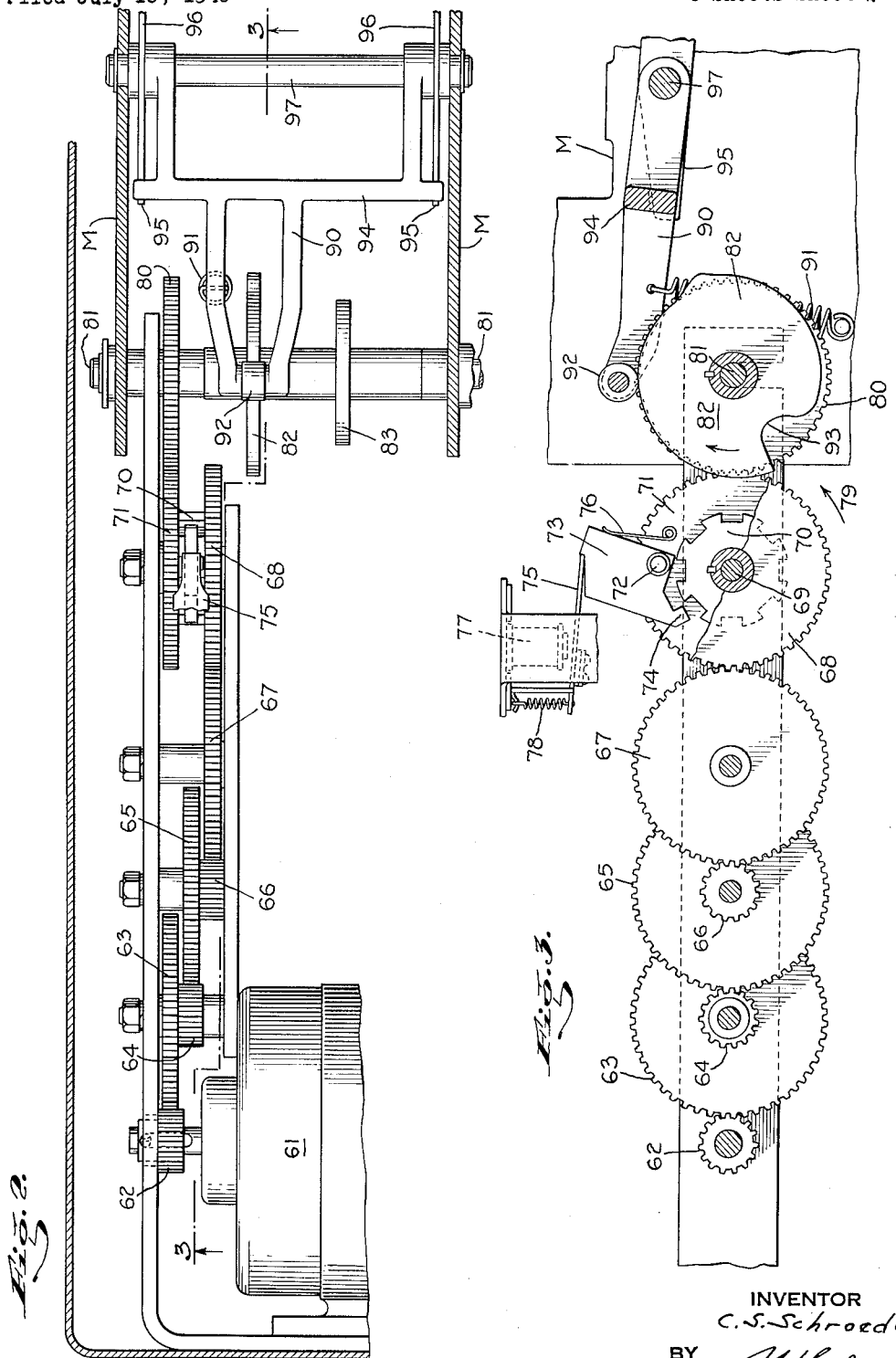
INVENTOR
C. S. Schroeder
BY
H. H. Golden
ATTORNEY Oct. 4, 1955     C. S. SCHROEDER     2,719,669
PRINTING SCALE
Filed July 15, 1949     6 Sheets-Sheet 3
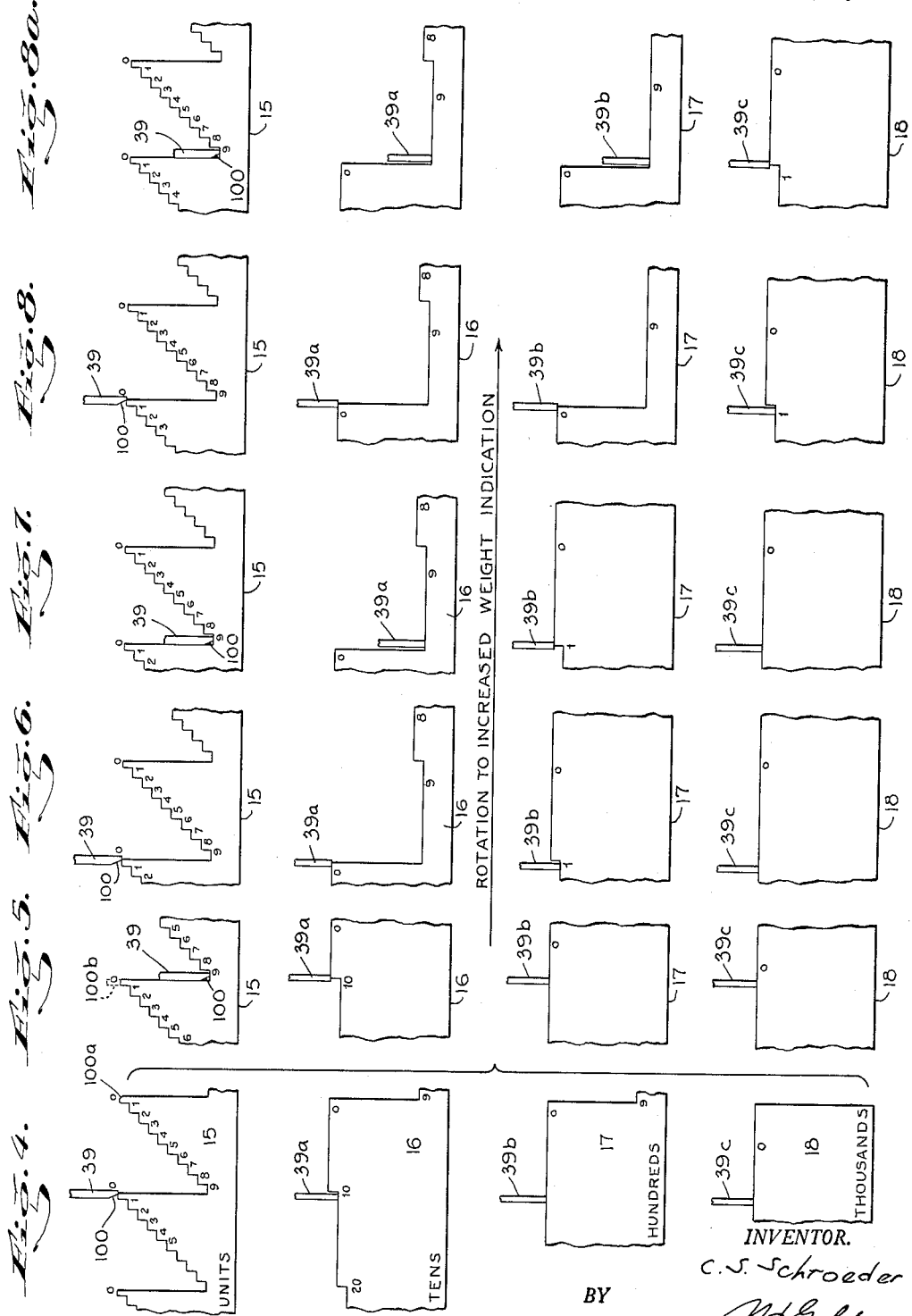
INVENTOR.
C. S. Schroeder
BY
H. Golden
ATTORNEY

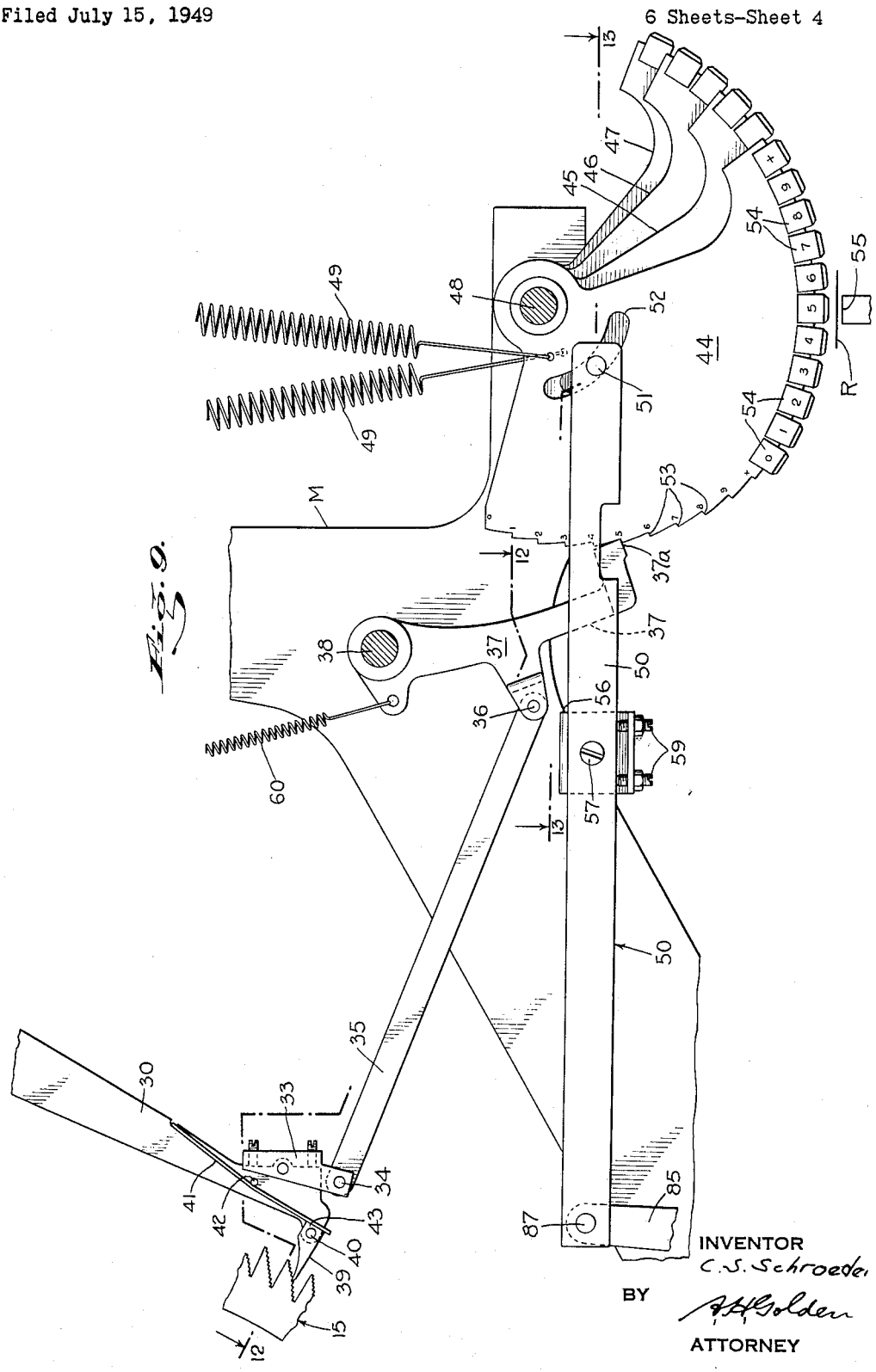

Oct. 4, 1955  C. S. SCHROEDER  2,719,669
PRINTING SCALE
Filed July 15, 1949  6 Sheets-Sheet 5
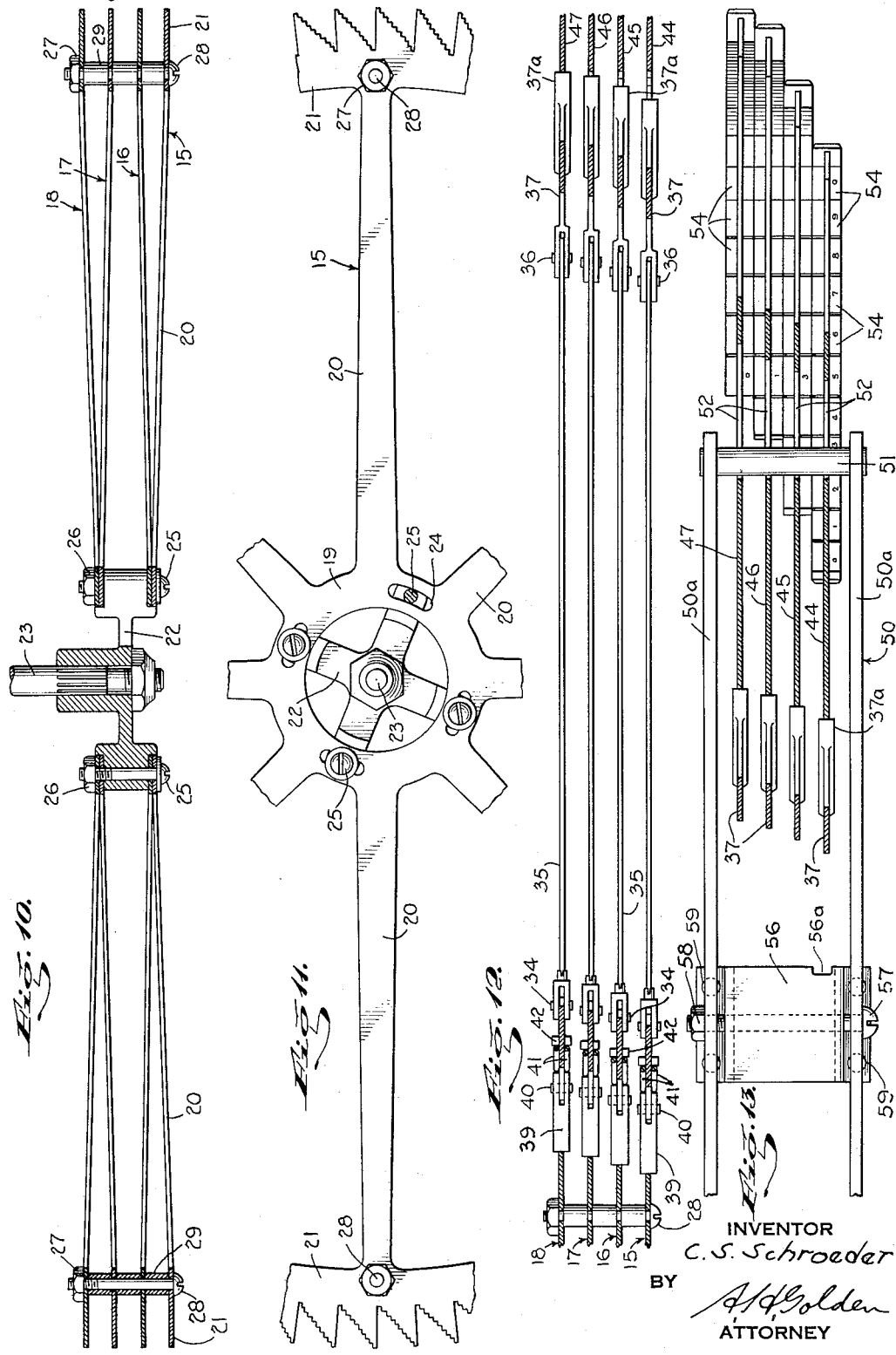
INVENTOR
C. S. Schroeder
BY
H H Golden
ATTORNEY Oct. 4, 1955     C. S. SCHROEDER     2,719,669
PRINTING SCALE
Filed July 15, 1949
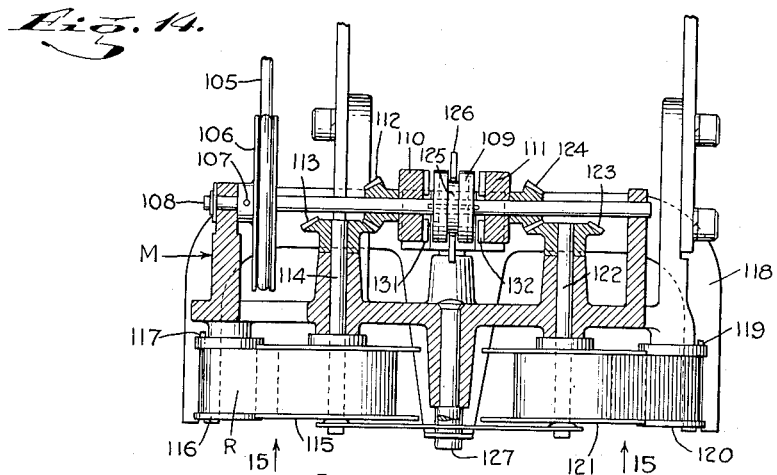
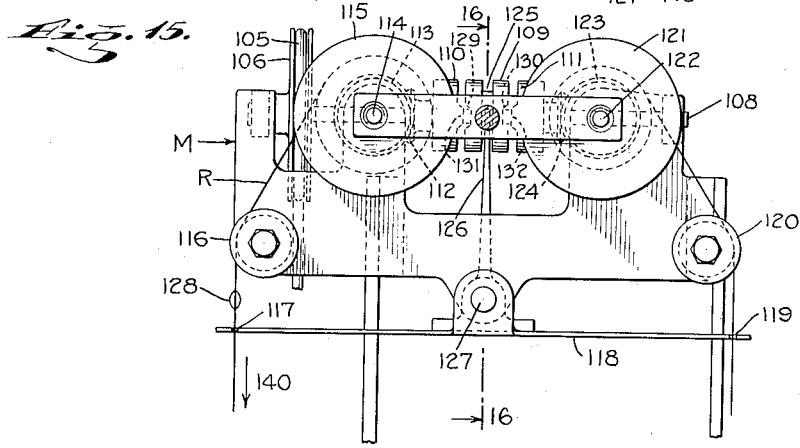
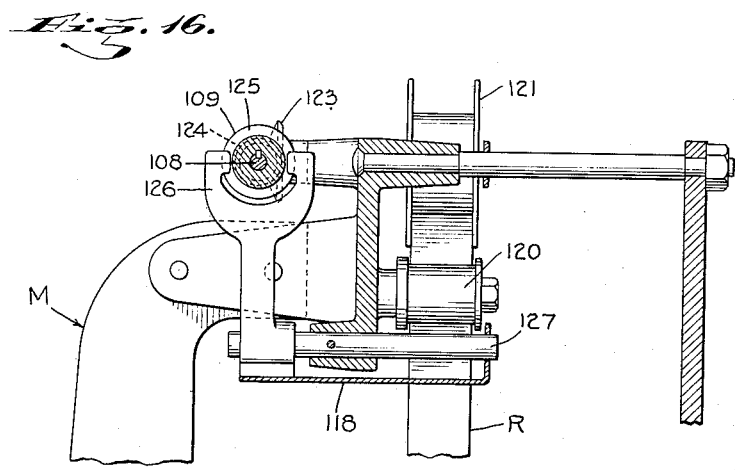
INVENTOR
C. S. Schroeder
BY
ATTORNEY United States Patent Office 2,719,669
Patented Oct. 4, 1955

2,719,669

PRINTING SCALE

Charles S. Schroeder, Philadelphia, Pa., assignor, by mesne assignments, to The Jacobs Bros. Co. Inc., New York, N. Y., a corporation of New York Application July 15, 1949, Serial No. 105,037

6 Claims. (Cl. 235—1)

This invention relates to means for effecting the positioning of indicating or recording mechanism in accordance with the measurement of a particular condition, such, for example, as the weight of some commodity. More particularly, my invention relates to sensing mechanism for controlling the positioning of printing members so that the printing members will record the weight that has previously acted on the sensing mechanism. Even more particularly, my invention relates to a weighing scale of the type having a plurality of rotating stepped members or discs adapted to be positioned in accordance with the weight of a commodity being weighed. A series of sensing feelers coact with the several discs, there being one sensing feeler for each disc. Through the action of the sensing feelers it is possible to position a series of printing members in accordance with the weight that has actuated the several stepped members or discs.

It is the object of my invention to eliminate certain errors in the coaction of the sensing feelers and the several stepped members or discs, all as those skilled in the art will fully appreciate.

In mechanisms of the particular type, when it is desirable to record a weight ranging from 0 to just over 1,000 pounds, use is made of four discs, a units disc, a tens disc, a hundreds disc, and a thousands disc. The units disc will have one hundred or more series of steps, each series having ten steps beginning with 1 and extending outwardly radially of the disc, the outermost step being the 0 step. Of course, in some cases, it may be desired to print ½ pounds, and in that case, the units disc may be graduated to ½ pounds, all as those skilled in the art will appreciate. The tens disc will have ten and a fraction series of steps, and each series of steps will include ten steps, the ten steps ranging from 10 to 00. Of course, the hundreds disc will have but one series of steps ranging from 100 to 000, plus just a little additional space to allow a recording of more than one thousand. The thousands discs will have but two steps, one of which will be 000 and the other 1,000.

In the units disc there will be a sharp drop from each 0 step down to the following number 1 step and so on, and since there are at least 100 series of steps there will be at least 1000 such drops. At each sharp drop of the units disc, there will be one short drop in the tens disc representing one step in a series. Between each series there will be one steep drop. There is but one series of steps in the hundreds disc, and at each drop in the hundreds disc representing one step there will be a steep drop in the tens disc and in the units disc. Of course, where a change in steps occurs in the thousands disc, there will be four drops, one in each of the discs.

At those points where a drop in a units and a tens disc occurs simultaneously, or where a drop occurs simultaneously in the units, tens, and hundreds discs, or in all four discs, there is encountered what the art terms a "critical" value. The value is termed "critical" because the four sensing feelers coacting with the discs, due to inaccuracies of manufacture and operation of the mechanism, may very well engage the discs at either side of a step at the critical value and thereby set the printing mechanism inaccurately to record an extremely incorrect weight. Thus, let us say that a value such as 100 is to be recorded by the setting of the several discs and by the consequent engagement of the discs by sensing feelers. Obviously, the units disc will be at a position wherein the feeler contacting the said disc will contact the 0 step in one of the series of steps. The same will be true of the tens disc. In the hundreds disc the feeler will contact the number 1 step just inwardly of the 0 step.

If the contact between the feelers and discs is made accurately as is required, the feelers will be set in the 100 position and the printing mechanism will be set accordingly under any of the several systems used by the prior art. However, any very slight variation of the parts may readily bring about that contact between the units sensing feeler and the units disc so that the units sensing feeler will contact the number 9 step of the units disc and the reading will now be 109. Further, it may be that the tens feeler may also contact the number 9 step instead of the 0 step and then the reading may be 199. Similarly, the units feeler might accurately contact the units disc and the same may be true of the hundreds feeler and its disc, but the tens feeler might contact the 9 step of its disc so that the reading will be 190. Further, the hundreds sensing feeler might contact incorrectly the hundreds disc and be positioned by the 0 step of the hundreds disc so that the final reading might be 099 or 090 or even 009 and 000.

Various mechanisms have been designed to prevent such incorrect coaction between the sensing feelers and measuring discs, but so far as I know, all such mechanisms have been quite costly and ineffective and have required considerable operating structure, as for example, that found in the Leonard Patent No. 2,370,805.

My invention contemplates an extremely simple solution of the problem by merely effecting the movement of the series of discs toward a safe minimum accurate indication through contact of the units sensing feeler and the units disc. When the units sensing feeler contacts the outermost step of the units disc, which in my particular invention happens to be the 0 step, if the contact is within a predetermined zone closely approaching the critical value, the surface relationship of the parts contacting one another will effect a rotation of the units disc and the other discs fixed thereto toward a reading that is no more than one unit less than may be the actual weight to be recorded. Thus, if the weight to be recorded is 499.9 as an example, rather than chance the possible alignment of a critical value opposite the sensing feelers, and the consequent possible recording of such great grossly incorrect values as 599, 509, 400, etc., I move my weight indicating measuring discs in a direction so as to complete a setting to 499. In other words, I arrange to move the disc assembly away from the critical point and thereby obtain a safe reading, even though it may be wrong to the extent of approximately a pound. Of course, after a discussion of the mechanism in the specification, I shall outline in detail just how my results are obtained.

More particularly, I merely provide a cam surface on the feeler that engages the radially outermost step of the units disc at all critical values and moves the units disc in a direction to record a decreased reading. While the cam surface is preferably on the feeler, it may very well be on the stepped surface as those skilled in the art will fully appreciate.

As a further feature of my invention, I arrange for an amplified movement of the printing members, that, in the case of my invention, take the form of rotating sectors. Thus, through a very simple arrangement of parts a very short movement of one of the sensing feelers will bring about a corresponding rather considerable movement of a printing sector so that relatively large type may be utilized on the printing sector despite the extremely small steps found on the stepped discs.

As a further feature of the invention, I utilize a novel mechanism for controlling the movement of the several feelers toward the several stepped discs while arranging for the following movement of the printing sectors upon the proper setting of the sensing feelers.

As an additional feature of this part of the invention, I arrange for cyclic movement of the sensing feelers and printing discs toward sensing and printing positions respectively and then away from printing and sensing positions.

As a still further feature of the invention, I utilize a constant moving mechanism with a one cycle clutch for bringing about the cyclic action of the sensing feelers and print sectors described.

As a still further feature of my invention, I contribute to the art an extremely novel printing ribbon reversing mechanism. In essence, I utilize a magnetic force for maintaining a driving member in engagement with one or the other of two driven elements. A slight shift of the driving member from one position to another causes it to disengage one driven element and to go firmly into engagement with the other driven element. Further, I provide means, preferably on the ribbon itself, although not necessarily so, for effecting the movement of the driving member away from one driven member and in a direction to engage by magnetic action the other driven member.

In the operation of mechanism of the class described, it may frequently be that the movement of the sensing feelers toward the discs will be initiated prior to the stoppage of the discs in response to a load applied to the scale. Obviously, the sensing feelers would then encounter moving discs and the steps of those discs might seriously damage the feelers. I have conceived and contributed spring positioned fingers on the sensing feelers that are normally maintained in extremely accurate relation to the sensing feelers, but which may be readily rotated out of operative position upon the application of force by the steps of the discs. Thereafter, the fingers may be readily restored to their initial operative position without tools and without skill.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a vertical section through a scale showing the sensing feelers in their relation to the stepped discs and illustrating the arrangement of the printing mechanism relatively thereto. Fig. 2 is a section taken along lines 2—2 of Fig. 1. Fig. 3 is a section taken along lines 3—3 of Fig. 2. Figs. 4, 5, 6, 7, 8, and 8a are views showing the relationship between the sensing feelers and the sensing discs at various critical values. Fig. 9 is an enlarged view of certain of the parts of Fig. 1 showing the manner in which the printing sectors are positioned by selecting members controlled by the sensing feelers. Fig. 10 is a diametric section through an assembly of the four discs used by me for coaction with the sensing feelers and is taken substantially along lines 10—10 of Fig. 1. Fig. 11 is a partial plan view of the assembly of the several discs of Fig. 10. Fig. 12 is a view taken along lines 12—12 of Fig. 9. Fig. 13 is a view taken along lines 13—13 of Fig. 9. Fig. 14 is a view taken substantially along lines 14—14 of Fig. 1. Fig. 15 is a view of the parts of Fig. 14 taken when looking in the direction of the arrows 15—15 of Fig. 14. Fig. 16 is a section taken along lines 16—16 of Fig. 15.

Referring now more particularly to the drawings, and more especially to Figs. 1, 10 and 11, the stepped members or discs of my invention are designated by reference numerals 15, 16, 17, and 18, and are respectively the units, tens, hundreds, and thousands discs. Each disc is formed substantially as is the disc 15 shown in Fig. 11, and comprises a central portion 19 having a series of eight spokes 20 extending therefrom, the spokes carrying the circular rim 21. In the case of the units disc 15, the rim 21 is formed with 1,040 steps in 104 series of steps, each series having 10 steps. Actually, the highest printable correct weight possible through the utilization of my mechanism is 1,019 pounds, all as will be quite clearly shown later.

The several discs 15 to 18 inclusive are secured to a hub 22 that in turn is splined to the indicator shaft 23 of a pendulum type scale of the class that is well known in the art. Because each of the central portions 19 of the several discs is slotted as at 24, it is possible through bolts 25 and nuts 26 to fix the several discs in adjusted relation to the hub 22 for rotation therewith. The rims 21 of the several discs will be secured by a series of nuts and bolts 27, 28 in the relationship shown in Fig. 10 with spacer sleeves 29 about the bolts 28 maintaining the discs in particular separated relation. It is now quite obvious that the discs 15, 16, 17, and 18 will rotate with the shaft 23 and hub 22 as the shaft 23 is rotated by a weight applied to the scale. I intend to rotate my discs and shaft 23 through the utilization of the mechanism illustrated and claimed in my application, Ser. No. 574,082 (Patent No. 2,618,476) filed January 23, 1945 for a Scale, but naturally, my invention of this application may be utilized with any scale of that type in which the discs 15–18 will rotate in proportion to a weight being measured. Further, my invention is applicable to other mechanisms with the discs moving in response to a measurement other than a weight measurement.

In the particular scale herein used to illustrate my invention, the disc 16 is equipped with ten series of steps, each series having ten steps. There are, in addition, four more steps so as to make it possible to print the number 1019 accurately with sufficient space therebeyond to compensate for the 104 series of the units disc 15. The hundreds disc 17 is equipped with merely ten steps plus one additional step therebeyond to make possible printing of the weight 1,019. The thousands disc is equipped with one main step equal to a 0 reading, a short step giving a 1,000 reading, and thereafter an extra spaced step giving an x reading to be discarded.

I shall now describe the mounting and actuation of one sensing feeler, using that sensing feeler cooperating with the units disc 15, it being understood that the remaining sensing feelers are exactly the same with the slight exception of a sensing finger, all as will be indicated shortly.

The sensing feeler coacting with the disc 15 is designated by reference numeral 30 as best seen in Figs. 1 and 9, and is pivoted at 31 to a part 32 that is integral with the main frame M of the machine. Sensing feeler 30 has secured thereto a block 33, and pivoted to the block 33 at 34 is a rod 35. Rod 35 is pivoted at 36 to a selecting lever 37 that in turn is pivoted at 38 to the main frame M of the mechanism. It is quite obvious that the selecting lever 37 will move together with the sensing feeler 30, but that the arc of movement of the selecting lever 37 will be considerably greater than the arc of movement of the sensing feeler 30 because of the relationships between the lengths of the sensing feeler and the selecting lever, and their pivot points 31, 38. Through this relationship of the parts, I therefore obtain a very greatly amplified movement of the selecting lever 37 through but a slight movement of the sensing feeler 30. This is extremely important since it is readily seen in Fig. 1 that each of the steps of the units disc 15 is exceedingly small. However, because of the amplified movement of the selecting lever 37, a small movement of the sensing feeler 30 will contribute a rather considerable movement of selecting lever 37.

The particular part of the sensing feeler assembly that actually contacts the disc 15 is called by me a finger, and is designated by reference numeral 39. Finger 39 is pivoted at 40 to the sensing feeler 30, and is maintained in the position illustrated in Figs. 1 and 9 by a U-spring 41. One leg of the U-spring, as well seen in Figs. 1 and 9, lies at one side of a stressing pin 42 and then against the flat end surface 43 of the finger 39. The other leg of the spring 41 will similarly act on the other side of the sensing feeler 30, its relation to the finger 39 being probably best illustrated in Fig. 12, where both legs of the spring 41 are shown in section.

Those skilled in the art will appreciate that once the several discs are brought to a standing position after being rotated by the application of a weight to the scale, it is then possible to allow movement of the sensing feeler 30 to bring the finger 39 against a particular step of the disc 15. The extent of the movement from the position of Fig. 1 to the position of Fig. 9 will depend on the particular step to be engaged by the finger 39. Of course, the selecting lever 37 will move in proportion to the movement of the finger 39, but for a greatly amplified distance. The purpose of the spring 41 and the construction of finger 39 is to prevent damage to the mechanism in the event the sensing feelers are moved towards the stepped discs 15—18 before the discs are brought to a standstill. Thus, if the discs are being rotated, and accidentally the sensing feelers are allowed to move toward the discs, the steps of the discs will merely rotate the sensing fingers against the resistance of the several springs 41 and the mechanism will not be damaged. This is an extremely valuable feature of my invention as those skilled in the art will appreciate.

The actual printing mechanism of my scale comprises a series of four printing sectors adapted to be positioned in accordance with the setting of the selecting levers 37, there being one sector for each lever 37 and each sensing feeler 30. The units printing sector is designated by reference numeral 44, as best shown in Fig. 9. The remaining sectors are designated by reference numerals 45, 46, and 47, and all four sectors are pivoted on the axis of a shaft 48 carried by the main frame M of the machine. Four springs 49 are adapted to rotate the sectors in a clockwise direction toward the selecting lever 37 upon release of the sectors from a control bar 50.

Control bar 50, as can best be seen from Figs. 9 and 13, comprises actually a pair of spaced bars 50a between which is carried a pin 51. Pin 51 extends through a series of slots 52 in sectors 44, there being one slot in each of the sectors 44. Through the particular arrangement the pin 51 is adapted, when the parts are in the position of Fig. 1, to hold the printing sectors out of printing position. Obviously, on movement of the bar to the left from the position of Fig. 1 to the position of Fig. 9, the four sectors are released for clockwise rotation, this clockwise rotation being limited by a surface 37a on each of the selecting levers 37.

Each of the printing sectors 44 is equipped with a series of radially spaced holding steps 53, each holding step corresponding to a number printing type 54 and one step in disc 15. Thus, each sector is equipped with ten holding steps and ten printing type members. Obviously, depending upon the position of the lever 37 in Fig. 9, the printing sector 44 will be rotated to position a particular printing type member in printing position. In Fig. 9 the number 5 holding step 53 is against the portion 37a of the selector lever 37 so that number 5 printing type is in position for coaction with a printing hammer 55. It follows, of course, that the sensing feeler has been moved to bring its finger 39 in position opposite the number 5 step of one series of steps of the units disc 15. This has positioned the selecting lever 37 in the number 5 position so that the units printing sector 44 has also been moved to the number 5 position with the number 5 type adapted for the printing operation.

At this point it will be well to indicate that a sensing feeler will coact with each one of the discs 16—18 in exactly the same manner as the sensing feeler 30 has contacted disc 15, and that through such action a particular printing disc 44—47 will be positioned through the setting of a selecting lever 37. The greatly amplified nature of the movement of the printing sectors relatively to the discs is well seen at this point by comparing a step of disc 15 with a step of sector 44.

The control bar 50 is not only adapted to move the printing sectors 44 into the non-printing position of Fig. 1 and then to release the said sectors for movement to the printing position of Fig. 9, but is also adapted to effect the movement of the sensing feelers into and out of sensing position. For this purpose, the control bar 50 mounts between its bar portions 50a a simple bracket 56 secured in place by a bolt 57 and a nut 58 and further adjusted by adjusting studs 59. The arrangement of the bracket 56 is such that when the control bar 50 is moved to the right in Fig. 9 the several printing sectors will first be actuated because of the contact of pin 51 with the ends of the several slots 52 of the printing sectors. Thereafter, the bracket 56 will strike the selecting levers 37 so as to move those selecting levers and the sensing feelers from the position of Fig. 9 to the position of Fig. 1. This last movement is in opposition to the series of springs 60, there being one spring for each sensing feeler-selecting lever combination.

In actual practice, the operator of the printing scale allows the several discs 15, 16, 17, and 18 to move into a particular weight indicating position, and he thereafter presses a button to start the operation of the printing mechanism through one complete cycle. This cycle I shall now explain by particular reference to Figs. 1, 2, and 3.

Secured to the frame of the machine is an electric motor 61 that drives a pinion 62. Pinion 62 in turn drives a gear 63 that actuates a pinion 64. Pinion 64 drives a gear 65 that in turn actuates a pinion 66 in engagement with a gear 67. Gear 67 is in driving engagement with a gear 68 that is keyed to a shaft 69, there being keyed also to the shaft 69 a ratcheted wheel 70. Freely mounted on the shaft 69 is a gear 71 having pivoted thereto at 72 a pawl 73 having a tooth 74 adapted to enter between the teeth of the ratcheded wheel 70. The pawl 73 is held by a dog 75 against movement by a spring 76 to bring its tooth 74 into engagement with the ratcheted wheel 70. Dog 75 is part of the armature of an electric relay 77, a spring 78 normally maintaining the armature in the position shown in Fig. 3.

When it is desired to actuate the printing mechanism through one complete printing cycle, the operator merely excites momentarily the relay 77 after starting the running of the motor 61. The exciting of the relay 77 moves the dog 75 away from obstructing relation to pawl 73. Spring 76 then rotates the pawl to engage the ratcheted wheel 70. This immediately effects a clutching of the gear 71 to the gear 68, and the gear 71 will move in a counter-clockwise direction designated by the arrow 79 in Fig. 3. In the meantime, the operator will have broken the circuit of the relay 77 with armature dog 75 moving to its position of Fig. 3, so that immediately upon completion of one full rotation the gear 71, pawl 73 will contact dog 75 to force the pawl 73 back to its position of Fig. 3. The motor 61 will continue rotating freely and the gear 68 will rotate freely, but there will be no further actuation of the gear 71. By this very simple and ingenious mechanism, I make it possible to utilize a continuously running motor while attaining cyclic actuation of my mechanism through the proper utilization of one complete revolution of the gear 71.

Gear 71 is in engagement with a gear 80 that drives a shaft 81, shaft 81 carrying a cam 82 and a further cam 83 best seen in Fig. 2. Cam 83 is called the sensing control cam, and its shape is probably best seen in Fig. 1. Coacting with the cam 83 is a roller 84 carried by a rather peculiarly shaped lever 85 pivoted at 86 to the main frame M of the machine. Lever 85 is pivoted at 87 to the control bar 50, earlier described, and effects the movement of the control bar to release the sensing feelers for movement by springs 60 toward the stepped discs 15—18, and also to release the several printing sectors 44—47 for movement by the springs 49 into engagement with selecting levers 37. Sensing cam 83 will, of course, act also on the lever 85 through the roller 84 to move the control bar 50 so as to withdraw the printing sectors from printing position and thereafter to withdraw the sensing feelers from engagement with the several stepped discs. It is, of course, obvious that this movement of the sensing feelers and printing sectors through one cycle takes place during one revolution of the gear 71 and one revolution of the gear 80, and therefore one revolution of the sensing cam 83, all being contributed by the single revolution clutching action of the pawl 73.

Cam 82 is called the printer cam (Fig. 3) and it controls a lever 90 that is moved by a spring 91 when a roller 92 on the lever 90 enters the dwell 93 of the cam 82. Immediately upon entry of the roller 92 into the dwell 93, the lever 90 will move sharply downwardly because of the action of spring 91, and the cross bar portion 94 of the lever 90 will contact the opposed arms 95 of a pair of levers 96. Levers 96 and lever 90 are pivoted on the same axis 97, for rotation simultaneously in one direction under the influence of the spring 91. The hammer 55 extends transversely between the levers 96 and is secured thereto for movement towards the type of the several printing sectors, as is quite obvious. Upon the return of the roller 92 to the position of Fig. 1 by the further rotation of the cam 82, the hammer 55 will merely drop by gravity, bringing the levers 96 in position under the cross bar 94 for further actuation by the lever 90 when the printing cam 82 is once again rotated to bring its dwell 93 under roller 92.

It may be well now to describe one complete operation of the sensing and printing mechanism. Upon the stoppage of rotation of the several measuring discs incidental to the application of a weight thereto, the operator will close the circuit of relay 77 to begin the rotation of the gear 80 through one revolution, and thereby to bring about a single revolution of the cams 82, 83. During the first part of this revolution, the several sensing feelers will be released by the bracket 56 for movement against the steps of the discs as shown in Fig. 9. As will later be emphasized in detail, it is essential in one form of my invention that the units feeler 30 be first allowed to contact its disc. This can be accomplished by having the bracket 56 irregular in shape, or by calibrating the surface 37a of the lever 37 associated with the units sensing feeler so that it is allowed to move to the left in Fig. 1 in advance of the other levers. Preferably the bracket 56 is cut away at 56a opposite the units selecting lever 37 so that said lever and the units sensing feeler 30 will be the first to move toward the several weight measuring discs 15—18.

Thereafter, the pin 51 of control bar 50 will release the several printing sectors, through further movement of the control bar 50 to the left from the position of Fig. 1 to the position of Fig. 9, to allow the printing sectors to assume positions predetermined by the selecting levers 37 and the sensing feelers 30. The dwell 93 will then come opposite the roller 92 and the printing hammer 55 will be actuated to print a number predetermined by the positioning of the printing sectors. Further rotation of the printing cam 83 and the shaft 81 will withdraw the roller 92 to a position approximately that shown in Fig. 1 so as to bring the printing hammer out of printing position. Thereafter, the further rotation of the selecting cam 83 will move the control bar 50 back to the position of Fig. 1. This movement will first be such as to bring the pin 51 against the ends of the several slots 52 of the printing sectors first to withdraw the printing sectors from printing position. Thereafter, the further movement of the control bar 50 will bring the bracket 56 against the several selecting levers 37 to move them into the position of Fig. 1 and to bring the sensing feelers away from the steps of the several discs.

As was earlier set forth, one of the important features of my invention resides in means for preventing the incorrect coaction between the sensing feelers and the measuring discs at all critical values. For a clear description of this part of my contribution, I shall make reference particularly to Figs. 4, 5, 6, 7, 8, 8a, and 9. In Fig. 4 as in Figs. 5, 6, 7, 8, and 8a, the several stepped discs are shown laid out in straight line form for convenience in describing the invention. The finger 39 of the units sensing disc, as shown in Fig. 4 is against the 0 step of one series of steps of the units wheel, it being recalled that there are 104 such series of steps. The finger 39a of the tens sensing feeler is shown in Fig. 4 in contact with the 10 step of one of the series of steps of the tens wheel. The finger 39b of the hundreds sensing feeler is merely against the 0 step of the hundreds disc and the same is true of the finger 39c, representing the thousands feeler. It will further be noted that while the finger 39 is bevelled at 100, the sensing fingers 39a, 39b and 39c are not so bevelled.

As was earlier indicated in the specification, it is the purpose of the bevelled surface 100 to engage the radially outermost step of the units disc 15 at all critical values, whereby to move that units disc and the other discs in a direction to record a decreased reading. Further, as was pointed out, while I have preferred to bevel the feeler finger 39, the 0 step itself could be bevelled as shown at 100a in Fig. 4, the results being the same. Let us first consider Fig. 4, remembering that here the four discs have moved to a 10 pound reading. It should be remembered further that the sensing finger 39 moved into contact with the 0 step of the units wheel in advance of the movement of the other sensing fingers against the other measuring disc. This can be accomplished by a change of the surface 37a or by the bevelling away of part of the bracket 56 as shown at 56a where that bracket coacts with the particular selecting lever 37 connected to the units sensing feeler 30. Further, the contact between the feeler 39 and the 0 step of the units disc might be arranged ahead of the contact between the remaining sensing feelers and discs by elongating the 0 step of the units disc as shown in dotted lines at 100b in Fig. 5.

In other words, it is possible to use several different means for effecting contact of the units sensing feeler with the outermost step of the units disc in advance of the contact between the remaining feelers and discs. Also, it is possible to obtain that camming arrangement that is necessary through use of alternate forms that have been described.

With the sensing feelers 39, 39a in the position shown in Fig. 4, the printer will print the number 10. It will be noted that the actual weight is probably just a little more than 10 pounds, but not quite 11 pounds. The finger 39a is well over on the 10 steps, and therefore the weight has been accurately recorded. Let us consider what happens if the several discs have moved not quite to the position shown in Fig. 4 so that instead of the end flat surface of the sensing finger 39 contacting the 0 step of the units wheel, the beveled surface 100 contacts the 0 step. Actually, the weight measured is then extremely close to 10, but it is quite possible for the units feeler to move against the 9 step while the tens feeler 39a is against the 10 step to give a reading of 19. Through my invention I arrange, because of the critical nature of the value being recorded, to obtain a safe recording of 9 pounds.

Thus, the cam surface 100 of the units feeler, through contact with the 0 step in Fig. 5, is effective in camming the discs in a direction showing a lesser weight than is actually on the scale. This immediately places the finger 39a on the 0 step of the tens disc, resulting in a reading of 9 pounds. Thus, where the weight was well beyond 10 pounds, as in Fig. 4, a recording of 10 pounds was permitted because finger 39 was well beyond the 9 step of the units disc. However, where the units feeler was not well beyond the 9 step, it was made to cam the units disc and the other discs to record a lesser reading of 9 pounds, as in Fig. 5.

Let us consider now Figs. 6 and 7. In Fig. 6 the weight to be recorded is 100 pounds, and will be recorded as 100 pounds because the units sensing finger 39 is well beyond the 9 step of the units disc. It will be appreciated that if the weight to be recorded were not quite that shown in Fig. 6, there would be a tendency for a mistake to be made through incorrect coaction of the sensing finger and the discs. Thus, the hundreds finger 39b could very well be deposited on the 0 step to give a reading of 0 or 000 or 009. Similarly, the hundreds feeler could be deposited on the 1 step as shown in Fig. 6, while the finger 39a contacted the 9 step of the tens disc to give a reading of 190. To prevent such inaccuracy, the cam surface 100 will actually cam the several discs to a safe reading of 99 where the 100 reading cannot be safely made. Thus, where the value is not well over 100 and less than 101, the cam surface 100 in Fig. 7 will cam the units disc and the tens and hundreds discs to a safe 90 reading.

In Figs. 8 and 8a I show the same relationship of the parts for the recording of 1,000 and for the alternate recording of 999. It can very readily be seen that in Fig. 8 a slight variation in the coaction of the units feeler might very well cause a recording of 1,999 pounds rather than a recording of the true value of 1,000 pounds. In order to obtain a safe and accurate recording, the beveled surface 100 of the units finger will, when the weight is not well over 1,000 pounds, contact the 0 step and cam the several discs into the 999 pound position. I believe that the rather considerable value of this portion of my invention will be well understood by those skilled in the art.

As part of my invention, I employ a novel form of inking ribbon moving mechanism. Thus, the shaft 81 on which are located cams 82, 83 drives a belt 105 that extends over a drive pulley 106, as best seen in Fig. 1, and as is also well illustrated in Figs. 14 and 15. Pulley 106 is pinned at 107 to a shaft 108, and splined to the shaft is a driving clutch member 109 rotatable with the shaft while slidable thereon. Freely rotatable on the shaft 108 is a driven clutch member 110 and a second driven clutch member 111. Fixed to clutch member 110 is a beveled gear 112 that drives a further beveled gear 113 that in turn rotates a shaft 114 carrying a ribbon supply spool 115. The ribbon is designated by reference letter R and it extends from the supply spool 115 over a guide pulley 116, through a slot 117 in a walking beam 118 and then downwardly into suitable guided relation to the printing sectors. From the printing sectors the ribbon extends upwardly through a further slot 119 in the walking beam 118 over a guide pulley 120 and then to a supply spool 121. Supply spool 121 is driven by shaft 122, the said shaft being rotated by a gear 123 in engagement with a gear 124 that is fixed to the driven clutch member 111.

The driving clutch member 109 is grooved as shown at 125 for coaction with an upwardly extending arm 126 forming a part of the walking beam 118. The walking beam 118 is pivoted at 127 and is adapted for movement in one direction or the other by a bead 128 secured near one end of the ribbon, and by another similar bead secured at the other end of the ribbon but not illustrated.

The driving clutch member 109 is equipped with transverse opposed grooves 129 and 130, the groove 129 coacting with a lug 131 on the driven clutch member 110 while the groove 130 coacts with a lug 132 on driven clutch 111. In operation, the belt 105 will rotate the pulley 106 and the shaft 108 to rotate the driving clutch member 109 always in one direction. The clutch member 109 is preferably made of some suitable magnetic material such as Alnico, while the driven clutch members 110 and 111 are made of a similar material or a material attracted to the Alnico whereby the driving clutch member, when moved axially of the shaft 108 in one direction or the other, will adhere to one or the other of the driven clutch members 110, 111.

When the driving clutch member 109 is in engagement with ribbon clutch member 111, gear 124 is rotated, and effects the rotation through gear 123 and shaft 122 of the supply spool 121. This moves the ribbon R off the supply roll 115 and winds it about the supply spool 121. When the end of that portion of the ribbon wound on the supply roll 115 is reached, the bead 128 will encounter walking beam 118. This bead 128 will naturally not move through the slot 117 as the ribbon R moves in the direction of the arrow 140 in Fig. 15 and therefore the walking beam 118 will be rotated about the pivot 127 to move driving clutch member 109 away from engagement with the driven clutch member 111 against the magnetic action tending to maintain the two in engagement. Once the driving clutch member 109 is brought past the central mark illustrated best in Fig. 15, its magnetic attraction to the clutch member 110 will snap it into position to engage the said clutch member 110. This will, of course, effect a reverse of the movement of the ribbon by driving clutch member 109. The ribbon will now move off the spool roll 121 and onto the supply roll 115 until a bead similar to 128 will move the walking beam 118 in a reverse direction to reverse the drive.

Those skilled in the art will appreciate that through a very simple arrangement of the parts and a most ingenious arrangement of magnetic material, I make it possible to move my ribbon in each of opposed directions in a most effective manner.

I now claim:

1. In a combination of the class described, a series of stepped members of that class adapted to move in response to a measurement and representing units, tens, hundreds, and so on of the measurement, a sensing feeler for each of said stepped members, means pivoting said feelers for movement toward and away from said stepped members, a rigid sensing finger movably mounted on one of said sensing feelers, and means yieldingly holding said sensing finger in a predetermined operating position relatively to said sensing feeler.

2. In a combination of the class described, a plurality of rotatable stepped discs mounted to rotate together about a particular axis in response to a measurement, each of said discs having series of steps with each step of one disc representing a minimum unit of measurement or fraction thereof, each step of the second of said discs representing tens of said unit, each step of the third disc hundreds of said unit, etc., a sensing feeler for each of said stepped discs, means for pressing said feelers toward said stepped discs, control means whereby the minimum unit sensing feeler contacts a step of its stepped disc in advance of contact between the other sensing feelers and their corresponding stepped discs, camming surfaces, including a surface on the minimum unit disc, contacting one another as said minimum unit sensing feeler moves toward contact with one predetermined step of any one of the series of steps of the minimum unit disc, said camming surfaces acting then through said contact to move said minimum unit disc together with the other stepped discs in that direction corresponding to a measurement in predetermined relation to the actual measurement.

3. In a combination of the class described, a plurality of rotatable stepped discs mounted to rotate together about a particular axis in response to a measurement, each of said discs having series of steps with each step of one disc representing a minimum unit of measurement or fraction thereof, each step of the second of said discs representing tens of said unit, each step of the third disc hundreds of said unit, etc., a sensing feeler for each of said stepped discs, means for pressing said feelers toward said stepped discs, control means whereby the minimum unit sensing feeler contacts a step of its stepped disc in advance of contact between the other sensing feelers and their corresponding stepped discs, a surface on said minimum unit sensing feeler moving into camming contact with one predetermined step of any one of the series of steps of the minimum unit disc when critical weight readings are encountered, said surface acting then against said step to move said minimum unit disc together with the other stepped discs in that direction corresponding to a decreased measurement.

4. In a combination of the class described, a plurality of rotatable stepped discs mounted to rotate together about a particular axis in response to a measurement, each of said discs having series of steps with each step of one disc representing a minimum unit of measurement or fraction thereof, each step of the second of said discs representing tens of said unit, each step of the third disc hundreds of said unit, etc., a sensing feeler for each of said stepped discs, means for pressing said feelers toward said stepped discs, control means whereby the minimum unit sensing feeler contacts a step of its stepped disc in advance of contact between the other sensing feelers and their corresponding stepped discs, camming surfaces on said feeler and disc contacting one another as said minimum unit sensing feeler moves into contact with the outermost step of any one of the series of steps of the minimum unit disc, said camming surfaces acting then through said contact to move said minimum unit step disc together with the other stepped discs in that direction corresponding to a decreased measurement.

5. In a combination of the class described, a plurality of rotatable stepped discs mounted to rotate together about a particular axis in response to a measurement, each of said discs having series of steps with each step of one disc representing a minimum unit of measurement or fraction thereof, each step of the second of said discs representing tens of said unit, each step of the third disc hundreds of said unit, etc., a sensing feeler for each of said stepped discs, means for pressing said feelers toward said stepped discs, control means whereby the minimum unit sensing feeler contacts a step of its stepped disc in advance of contact between the other sensing feelers and their corresponding stepped discs, camming surfaces on said minimum unit disc and said minimum unit sensing feeler moving into contact when one predetermined step of any one of the series of steps of the minimum unit disc is encountered by said minimum unit feeler, said camming surfaces acting then through said contact to move said minimum unit disc together with the other stepped discs in that direction corresponding to a decreased measurement.

6. In a combination of the class described, a plurality of rotatable stepped discs mounted to rotate together about a particular axis in response to a measurement, each of said discs having series of steps with each step of one disc representing a minimum unit of measurement or fraction thereof, each step of the second of said discs representing tens of said unit, each step of the third disc hundreds of said unit, etc., a sensing feeler for each of said stepped discs, means for pressing said feelers toward said stepped discs, control means whereby one of said feelers contacts its disc in advance of contact of the remaining discs by their respective feelers, camming surfaces, including a surface on a disc, movable into contact with one another incidental to the movement of said sensing feelers into contact with one predetermined critical step of the class described of its disc, said camming surfaces acting then through said contact to move all of said discs together as a unit in a predetermined direction a distance predetermined by the shape of said camming surfaces and sufficient to bring said discs away from a critical reading.

References Cited in the file of this patent

UNITED STATES PATENTS

| 1,192,967 | Willners | Aug. 1, 1916 |
| 2,131,683 | Basguin et al. | Sept. 27, 1938 |
| 2,288,761 | Williams | July 7, 1942 |
| 2,370,805 | Leonard | Mar. 6, 1945 |
| 2,397,562 | Potter | Apr. 2, 1946 |
| 2,451,365 | Spencer et al. | Oct. 12, 1948 |
| 2,508,589 | Wirth | May 23, 1950 |

FOREIGN PATENTS

| 299,377 | Great Britain | Feb. 24, 1930 |
| 541,928 | Great Britain | Dec. 18, 1941 |